O. M. EDWARDS.
WIND SHIELD FOR VEHICLES.
APPLICATION FILED FEB. 1, 1909.

1,143,616.

Patented June 22, 1915.

Witnesses:
Raphaël Netter
Florence E. Newbury

Oliver M. Edwards, Inventor
By his Attorney Henry T. Newbury

UNITED STATES PATENT OFFICE.

OLIVER M. EDWARDS, OF SYRACUSE, NEW YORK.

WIND-SHIELD FOR VEHICLES.

1,143,616.         Specification of Letters Patent.         Patented June 22, 1915.

Application filed February 1, 1909. Serial No. 475,333.

*To all whom it may concern:*

Be it known that I, OLIVER M. EDWARDS, a citizen of the United States, residing in the city of Syracuse, county of Onondaga, and State of New York, have invented certain new and useful Improvements in Wind-Shields for Vehicles, of which the following is a full, clear, and exact description, reference being had to the drawings accompanying and forming a part of the same.

My invention relates, generally stated, to shields or guards commonly known as "wind shields" which are more or less transparent and arranged in front of the driver's or operator's seat of automobiles and other vehicles to more or less protect those riding therein from the effects of quickly passing through the air, against the wind or in storms and it relates more particularly to that class of wind shields having a movable portion or portions adapted to be moved more or less out of the protecting position that such shields usually occupy in use.

The object of my invention is to provide a "wind shield" having its movable portion or portions fixedly held in the desired position and yet quickly and conveniently moved into and out of protecting position, as desired, and preferably without the driver or operator leaving his seat in the car or vehicle; other objects will appear from the descriptions hereinafter given.

The invention consists, generally stated, in combining a "wind shield" having a movable portion suitably mounted and supported, with holding means adapted to hold the movable portion of the shield in fixed relations relatively to the car or vehicle where the shield is to be used and releasing such portion when it is to be moved to change the position of such portion and operating means connected with such holding means, a portion of which is located at a point separate from the point where such holding means are located, which portion so located is preferably within convenient reach of the driver or operator of the car or vehicle and is also preferably adjacent to means adapted to be grasped by the hand of the operator to move the movable portion of the shield from one desired position to another; and it also consists in the combinations of parts or devices hereinafter set forth and particularly pointed out in the claims hereunto annexed and forming a part of this specification.

Like letters of reference, wherever they occur, indicate corresponding parts in the several figures of the drawings.

In Figs. 1 to 10, inclusive, A represents that portion of the automobile, car or carriage to which the wind shield therein shown is attached and B represents that portion of the car or carriage to which the means for holding or supporting a portion of the shield in position is attached. C represents the wind shield and D the movable portion thereof which is here preferably shown as practically the entire shield or guard. The shield here shown is composed of a frame $c$ in which is mounted the glass $c'$. Any desired form of means may be employed for connecting the movable part of the wind shield to the immovable part thereof or to the car or vehicle such as is here shown or otherwise. As here shown the movable portion of the wind shield is connected to the car or vehicle by means of a pivotal connection formed of two members one as $d$, and the other as $a$, the latter preferably being placed at each edge or side portion of the shield. The member $d$ is preferably attached to the movable portion of the wind shield and the portions of the member $a$ are attached to the part A of the car or vehicle, as is more clearly seen in Figs. 2, 3 and 7.

It is desirable in hinging the movable portion of the wind shield to the fixed portion thereof or to the vehicle, that means be provided to firmly hold such portion and prevent rattling and noise from any looseness of the hinge members that may occur from wear or otherwise, and that such movable portion shall be held tightly and yet be readily movable when it is to be moved from one desired position to another. I accomplish this work of tightly holding the movable portion of the shield by interposing between the fixed portion of the shield and the movable portion a rod or bar R, of india rubber or other more or less elastic material, preferably cylindrical in form, as shown in cross section in Fig. 3. This rod R of india rubber or other material is preferably arranged in a semi-circular bearing or trough in the upper part of the fixed portion of the shield or that part of the vehicle to which the movable portion of the shield is to be hinged, after the manner shown in Figs. 2 and 3 of the drawings. The lowermost edge of the movable portion of the shield is preferably formed, as seen in cross section in Fig. 3, but it may be otherwise formed if desired. When thus formed there is a cam portion $c^2$ so formed and arranged that when the movable portion of the shield is in protecting position, this cam portion $c^2$ compresses the rubber rod R to the desired extent to firmly hold the movable portion of the shield against rattling or movement in the hinge members by which such portion of the shield is attached to the vehicle or other fixed portion. The formation of the lower or hinge portion of the movable member of the shield in the form shown in Fig. 3 also provides a space for receiving counterbalancing means or springs to aid in the movement of such movable portion from one position to another. This is the preferred form in which this part of the movable portion of the shield is to be formed and the axial line of the spring or springs is the same as that of the hinge members, but such edge portion may be otherwise formed if desired and the counterbalancing means be otherwise arranged as, for instance as in the construction seen in Figs. 14 to 17.

Figures 4, 5, 6, 7, 8, 9:
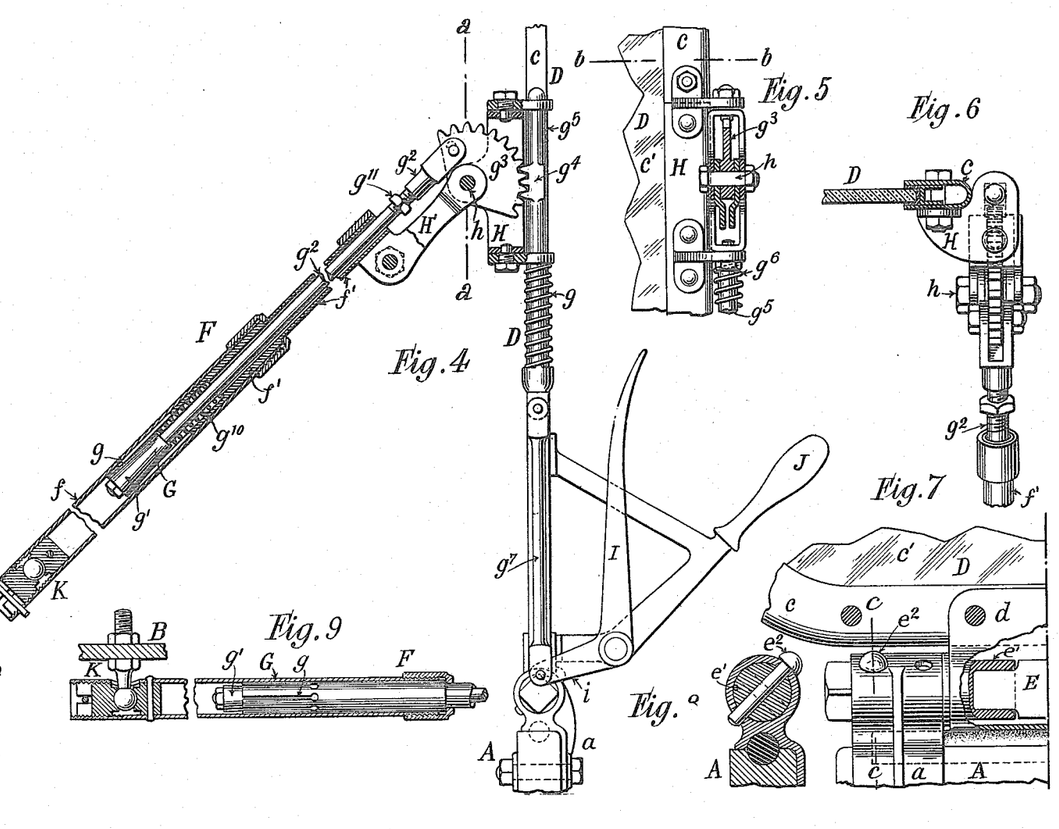
Fig. 4 shows in side elevation and partly in section the attachment of the means provided for moving the movable portion of the wind shield to and from the protecting position and for securing and releasing the shield when it is desired to move the same from one position to another.
Fig. 5 shows the upper portion of the construction seen on line $a-a$ of Fig. 4 when looking from left to right, the pivotal attachment of the segment of a gear being shown in full lines instead of in section.
Fig. 6 shows in plan with a portion of the wind shield in section and other parts as seen on line $b-b$ of Fig. 5 being that part of the construction illustrated in the upper portion of Fig. 4.
Fig. 7 shows in front elevation and on an enlarged scale the attachment of the wind shield to the automobile, as seen at the left hand lower portion of Fig. 2 of the drawings, with a portion broken away to better illustrate the attachment of one end of a torsional spring, preferably employed in this embodiment of the invention, for assisting in the control of the wind shield.
Fig. 8 illustrates in vertical section on line $c-c$ the parts by which the wind shield is made movable relatively to the dash of the car or vehicle to which such shield is preferably attached.
Fig. 9 shows a portion of the construction of holding means seen in Fig. 4 with the connection between the lower end of such means and the automobile in full lines, and it also shows the form of clamping means partly in section, which frictionally secure different portions of the holding means together.

In this embodiment of my invention, I have shown torsional springs in connection with the hinging or pivotal connection of the movable portion of the wind shield to the car or carriage, which springs aid in the handling of the wind shield to and from the protecting position, such springs counteracting or counterbalancing, more or less, the action of gravity upon the shield. The form of springs here shown is the preferred form, but other forms may be employed if desired, as the form of the spring is immaterial to my invention where springs are used to counteract or counterbalance the action of gravity. As here shown, this torsional spring or springs E are connected at one end, (the right hand end in Fig. 2) to the wind shield by a fastening device $e$ secured thereto and at the other end such spring or springs is attached to the member $a$ of the hinge or pivotal connection by a part $e'$ and a pin $e^2$ as seen in Figs. 7 and 8 of the drawings, such part $e'$ being rotatable in the member $a$ of the pivotal connection for the movable portion of the shield for the purpose of adjusting the tension of such spring or springs to the desired extent. This rotatable part $e'$ is provided at its outer end, as is clearly seen in Fig. 7, with a squared portion by which such part may be rotated and then when the tension of such spring or springs is brought up to the desired point, the pin $e^2$ is inserted in one of the two openings in the member $a$ and into one of the two corresponding openings in the part $e'$, these latter openings being arranged at right angles to one another, as is indicated in Fig. 8. By means of these different openings the tension of the spring or springs E can be more finely adjusted than would be the case if there were only one opening for the pin in the member $a$ and one in the part $e'$.

In order that the movable portion of the wind shield shall be held firmly in its different desired positions, it is desirable that it shall be suitably held or braced by means adapted to hold the movable portion of the shield against the action of wind or gravity when the car is used. In the embodiment shown in Figs. 1 to 10, the form of means employed to firmly hold such movable portion of the shield in position is such that such means may be as it were lengthened or shortened between its points of attachment to the vehicle and the movable portion of the shield is to occupy. This is accomplished by making different portions of such means movable relatively to one another and to their points of attachment to the vehicle and the movable part or portion of the shield. The preferred form of such means is the telescopic form employed in the embodiments of my invention herein shown. In this telescopic form of holding or bracing means there are two portions of a well known form one of which is movable within the other, one portion being movably attached to the movable portion of the shield and the other movably attached to the vehicle, and such portions move relatively to one another in substantially parallel directions when the movable portion of the shield is moved from one position to another. These two portions of this preferred and well known form is herein provided with means by which such portions may be securely held in fixed relations to one another and to their points of attachment and released therefrom so as to firmly hold and brace the movable portion of the shield, and permit such portion of the shield to be moved from one position to another which means, for convenience, are termed "holding means." Such holding means are preferably duplicated that is, there is a telescopic form of holding means arranged at each of the opposite sides of the shield, as is particularly seen in Fig. 2, but if desired the "holding means" may be differently arranged. As thus shown each of the "holding means" have connected therewith operating means by which a portion or portions of each holding means is moved relatively to another portion or portions for locking or firmly securing the different portions of the holding means in fixed relations to one another and releasing them therefrom.

Figure 1:
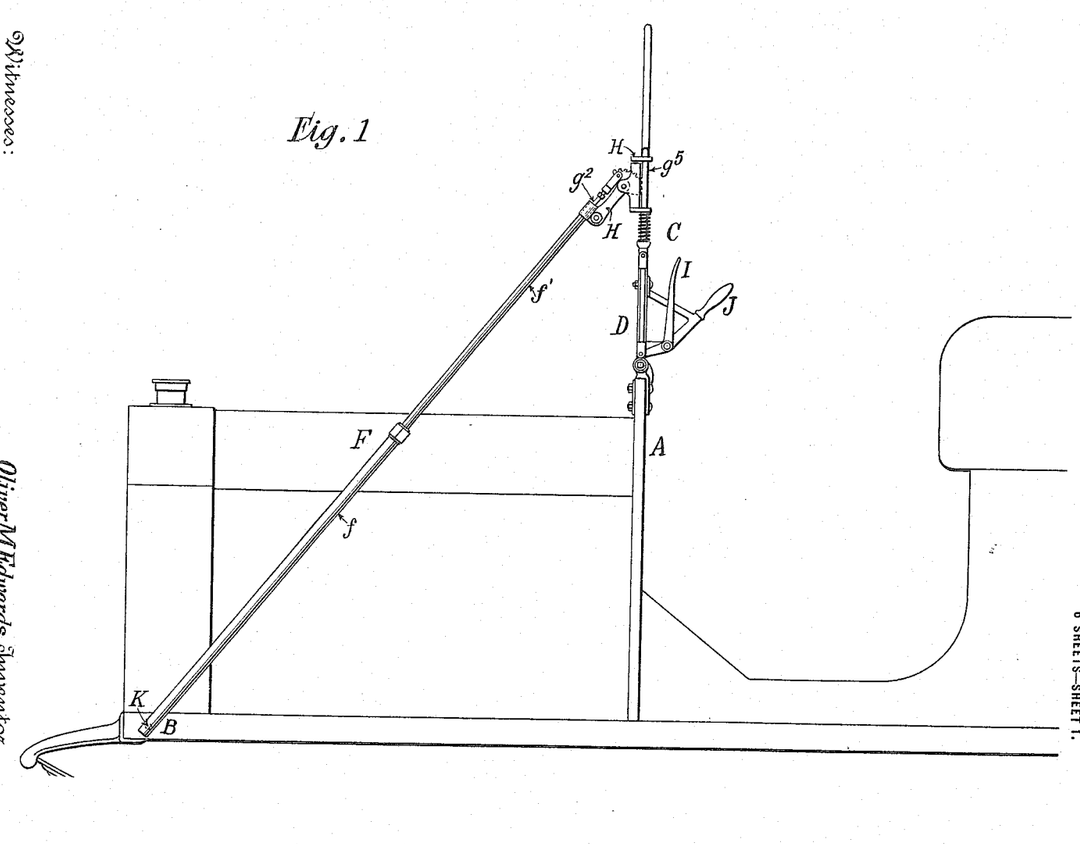
Figure 1 illustrates in side elevation a portion of the body of an automobile having one embodiment of my invention combined therewith, the wind shield being shown in the protecting position.

The duplicate telescopic holding means are designated as F F', the outer telescopic portion $f$ receiving the inner telescopic portion $f'$ in each of the duplicate holding means, which portions are movable in an endwise direction relatively to each other or in directions substantially parallel, one with the other. The outer telescopic portion $f$ is preferably attached at its lower end to the car or vehicle B by a ball and socket joint K, as shown in Fig. 1, which joint is seen on an enlarged scale in Figs. 4 and 9 of the drawings. These ball and socket joints K pivotally attach the telescopic sections $f$ of the duplicate holding means to the vehicle so that they may move relatively thereto when moving the movable portion of the shield from one position to another. The inner telescopic section $f'$ is pivotally attached to the movable portion of the shield through being secured to the hanger or bracket H', which is pivotally attached to frame H, secured to the movable portion of the shield, as indicated in Figs. 1, 2, 4, 5, 6 and 10 of the drawings. This hanger or bracket H' is fixedly secured to the telescopic section $f'$, so that that section is pivotally movable relatively to the movable portion of the shield with which it is connected. These telescopic sections $f$ and $f'$ are fixedly secured together by means, a portion of which is movable into and out of frictional contact with one of such sections. These means G consist as shown of a split shell section $g$ formed on and as a part of the telescopic section $f'$, as seen in Figs. 4 and 9 of the drawings. This split portion $g$ is interiorly tapered or made slightly conical so as to receive within such portion the slightly tapered or conical part $g'$, which when moved endwise into the split shell portion forces the divided parts of such portion into frictional contact with the interior surface of the telescopic section $f$ and with sufficient force to firmly secure these telescopic sections together. Upon the movement of this slightly conical or tapered part $g'$ in the opposite direction or outwardly of the shell portion the divided parts of such shell portion are released from their holding contact with the section $f$ and such telescopic sections are then free to move relatively to each other in an endwise direction or in substantially a parallel direction to one another, one moving within the other after the manner in which the portions of a telescope move.

Figure 10:
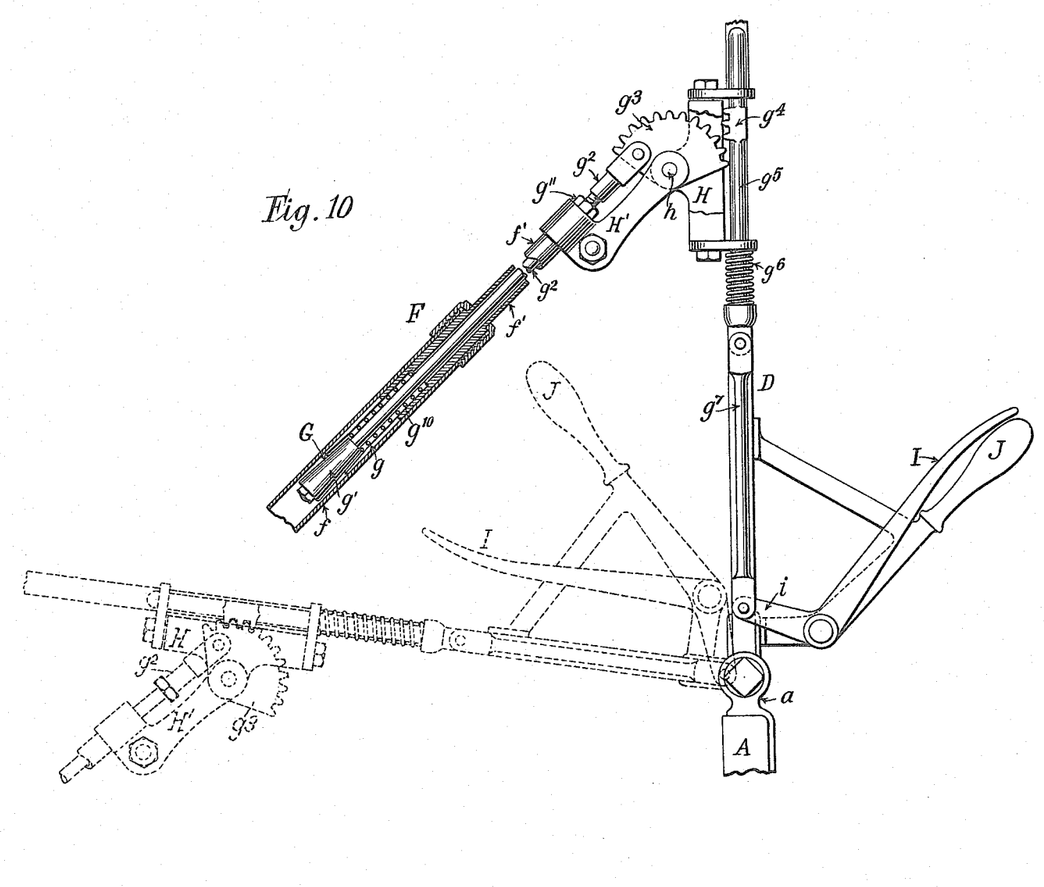
Fig. 10 shows in side elevation and partly in section the positions of the parts of the operating and holding means when the operator or driver of the car or carriage has grasped the handle portion of the operating means and operated a portion of the holding means ready for such operator or driver to move the movable portion of the wind shield from the position seen in full lines to the position seen in dotted lines and release the holding means, so that they operate and move from the position seen in full lines in said Fig. 10 to that indicated in dotted lines in said figure.

Movement of the slightly conical or tapered portion $g'$ of the holding means into and out of the split shell portion $g$ is caused to take place, as shown, by the use of operating means connected to such conical part $g'$. These operating means, as here shown, are provided for each of the duplicate holding means, one for each holding means. As seen in Figs. 4, 9 and 10 the conical part $g'$ of the holding means is attached to or mounted upon a stem or rod $g^2$ which passes through the split shell section and telescopic section $f'$ and is pivotally attached to a segment of a gear $g^3$ which segment is pivotally attached by a pin $h$ to the frame H fixedly secured to the movable part of the shield. The movement of this segmental gear $g^3$ on its pivot or pin $h$ causes the stem $g^2$ of the operating means to move in an endwise direction relatively to the telescopic section $f'$ within which it is carried and owing to the fact that the conical part $g'$ is secured to such stem $g^2$, such conical part moves correspondingly as the stem moves relatively to the split shell $g$ and telescopic section $f'$ and thereby locks the sections together and releases them from their locked position. The positions of the different portions of the holding means relatively to each other and to the parts to which they are attached when fixedly secured together are seen in Figs. 4 and 9 and when the telescopic sections of such holding means are released or unlocked for the purpose of changing the position of the movable portion of the shield the positions of the parts $g$, $g'$ are seen in Fig. 10 where the holding means have been operated and the parts are in the released position for moving the movable portion of the shield from the position seen in full lines to that seen in dotted lines. The segment $g^3$ is engageable with and disengageable from a section of a rack $g^4$ attached fixedly to an endwise movable rod $g^5$ movably mounted in the frame H. This rod $g^5$ has on its lower end portion a spring $g^6$ the tension of which tends to move the rod $g^5$ in the frame H toward the hinge portion of the shield, one end of such spring resting against a portion of the frame H and the other end against the shoulder on the lower end portion of the rod $g^5$. This rod $g^5$ has attached at its end nearest the hinge of the movable portion of the shield one end of a pitman $g^7$ the other end of which is pivotally attached to the short end $i$ of an elbow lever I, which lever as shown is preferably pivotally mounted upon the movable portion of the shield and is also preferably arranged or located adjacent to the handle portion thereof, J, as seen in Figs. 4 and 10 of the drawings. As seen in Fig. 4 this section of a rack $g^4$ is in engagement with the segmental gear $g^3$ so that when the rod $g^5$ is moved away from the hinge portion of the shield or upwardly by the handle or lever I from the position seen in Fig. 4 to that seen in full lines in Fig. 10 such segmental gear is turned on its pivotal connection $h$ and the stem $g^2$ of the holding means is moved from the holding position seen in Fig. 4 to that seen in Fig. 10 in full lines. When the parts are in the positions seen in Fig. 10 the holding means are in the unlocked or released position and the telescopic sections are free to telescope or move endwise relatively to one another, so that the movable portion of the shield can be moved from the position seen in full lines in Fig. 10 to that seen in dotted lines. The movable portion of the shield or guard is preferably provided at each of its opposite side edges with a handle portion J which is adapted to be grasped to move such movable portion from either side thereof, as such handle portions are preferably fixedly secured to such movable portion, and consequently such portion can be moved by grasping either one of the two handle portions J.

Figure 2:
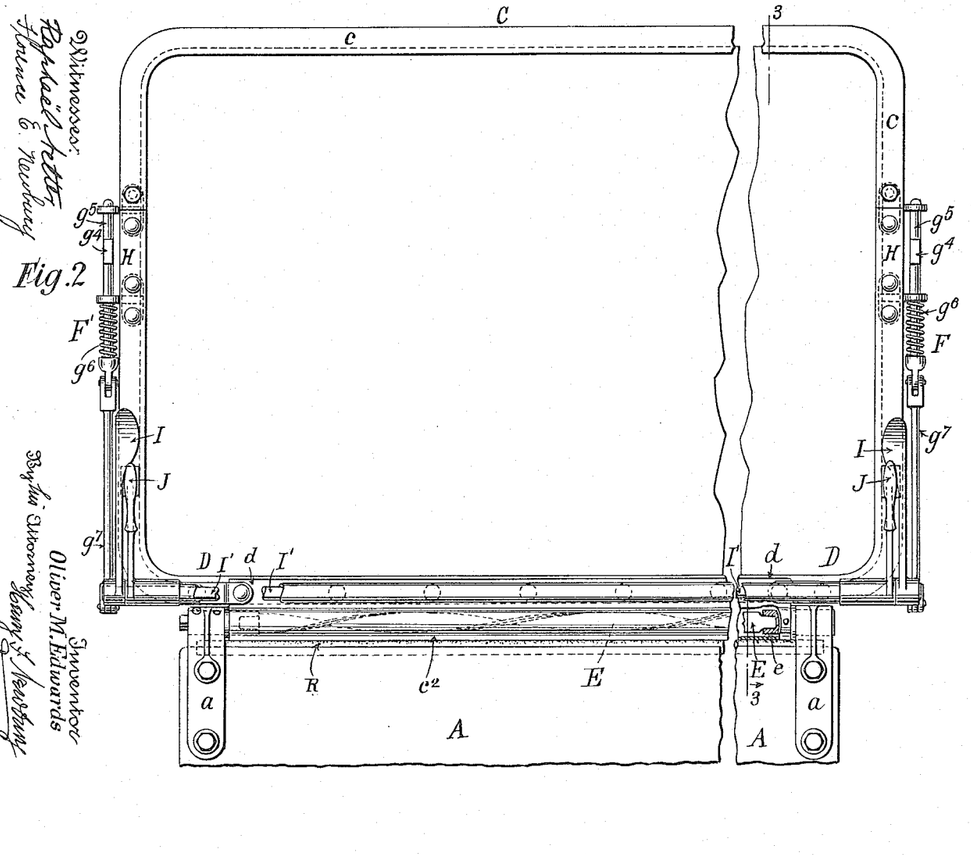
Fig. 2 shows the wind shield seen in Fig. 1 in front elevation or as seen when one is standing in front of the automobile, such shield being partly broken away in order to show the construction on a larger scale than that seen in Fig. 1 and also to better illustrate certain features of the construction.
Figure 3:
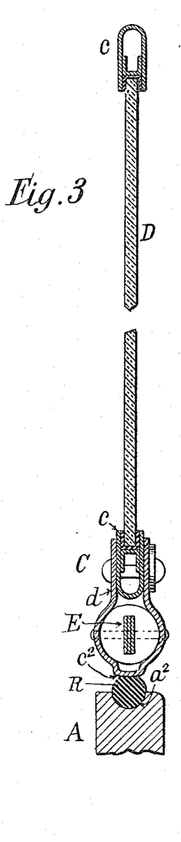
Fig. 3 illustrates in sectional view the wind shield and its attachment to the dash or front portion of the automobile as seen on line 3—3 of Fig. 2 when looking from left to right, as indicated by the arrow head seen on said figure.

As before explained the handle portions of the operating means by which the telescopic sections of the holding means are locked together and unlocked, are preferably connected together, as shown in Fig. 2, by the rod I', so that when one of such handle portions is grasped and moved the other at the opposite side edge of the shield is also correspondingly moved and hence, such operating means are made to operate the holding means at opposite side edges of the shield upon the movement by the hand of the operator of either one of such handle portions I. Thus upon the movement by the operator of the handle portion I of the operating means seen in Fig. 4 into the position seen in full lines in Fig. 10, the holding means at the opposite side edges of the shield will be operated and the movable portion of the shield moved from one position to another. This movement of rod $g^5$ and rack $g^4$ attached thereto will move such parts from the positions seen in Fig. 4 into the positions seen in full lines in Fig. 10, the rack $g^4$ having rotated the segmental gear $g^3$ to the extent there seen and disengaged therefrom, thereby moving the stem $g^2$ and conical part $g$ of the holding means to the extent shown in full lines in Fig. 10 where, as before explained, the parts are shown with the holding means in the released or unlocked position.

The operator is now free to move the movable part of the shield from the position seen in full lines to that seen in dotted lines. Upon the operator, after moving the movable portion of the shield, releasing his hold upon the handle portions J and I, the handle portion I, by reason of the tension of the spring $g^6$, is moved relatively to the handle J and into the position shown in dotted lines, where the different portions of the holding means are shown in their locked or fixedly secured position with the movable portion of the shield in nearly a horizontal position instead of in substantially an upright position, as shown in full lines in said Figs. 4 and 10. By reason of the handles I being connected together by the rod I' as seen in Fig. 2, when one is grasped and moved the other one correspondingly moves, and, consequently the springs $g^6$ on the duplicate operating means tend to act together to return the handles I from the position seen in full lines in Fig. 10 to that seen in dotted lines. A spiral spring $g^{10}$ is arranged within telescopic section F', as seen in Figs. 4 and 10, with one end bearing against such section and its other end bearing against an end of the conical part $g'$, the tension of which tends to move such conical part and the stem $g^2$ endwise relatively to the telescopic section F' until the nut $g^{11}$ on stem $g^2$ is in engagement with bracket or hanger H', as seen in Fig. 4. This provides for the proper engagement of the rack $g^4$ with the teeth of the segmental gear $g^3$ on return movement of such rack from the position seen in Fig. 10 to that seen in Fig. 4.

Figures 11, 12, 13:
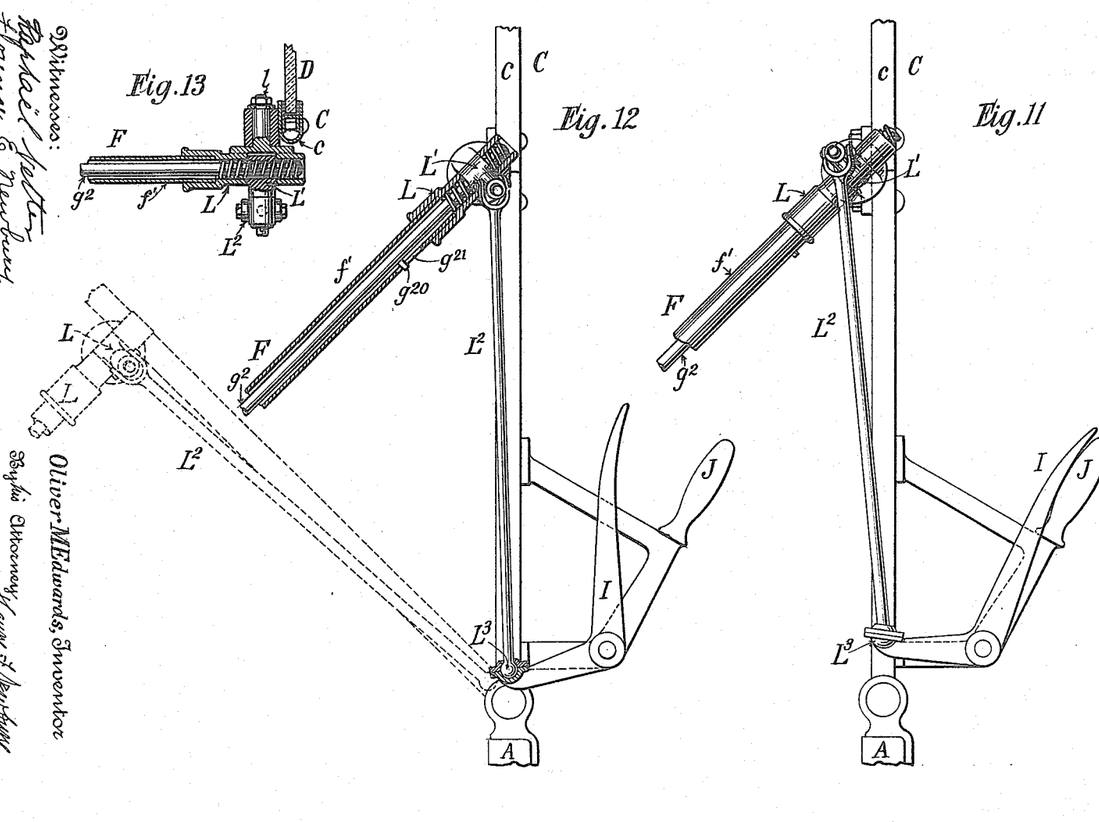
Fig. 11 shows in side elevation a modified construction of means for operating the shield or guard and the holding means when moving the movable portion of the wind shield to and from the protecting position, the parts being seen in full lines in the positions they occupy when the operator or driver has sufficiently operated such means to release the holding means and is ready to move the movable portion of the wind shield from the full protecting position into another position.
Fig. 12 shows the parts seen in Fig. 11 in full lines and partly in section, such parts occupying the positions they occupy, when the wind shield is secured in the full protecting position.
Fig. 13 shows in plan and in section that which is seen in the upper portion of Fig. 12.

The embodiment of my invention illustrated in Figs. 11, 12 and 13 is, so far as concerns the movable portion of the windshield itself and the telescopic sections of the holding means, the same as the embodiment shown in preceding figures, but different from that embodiment in that there is a modified form of means for operating the holding means by which the telescopic sections of such means are fixedly secured together and released. These operating means in this embodiment are much simpler and composed of fewer parts and are more positive in their operation than is the case with the operating means shown in preceding figures. The stem $g^2$ to which the slightly conical part or male member $g'$ is attached is provided at its end adjacent to the shield with screw threads of a sufficient pitch to move such stem endwise to the desired extent for moving this conical part or male member of the holding means relatively to the female member for the purpose of releasing and fixedly securing the telescopic sections of the holding means together. The interior telescopic section $f'$ seen in preceding figures is secured to a pivotally mounted sleeve L. This sleeve L is pivotally attached to a frame on the shield by a shank $l$, more particularly seen in Fig. 13, so that such sleeve may partially turn or rotate in a direction parallel or substantially parallel with the movement of the pivotally mounted telescopic sections of the holding means when moving the movable portion of the shield from one position to another. The sleeve L is provided with a part L' mounted therein so as to partially rotate without movement endwise thereof having female screw threads corresponding in pitch with the pitch of the threads on the stem $g^2$, so that, as such part or nut L' rotates upon the stem, the stem is given an endwise movement in the telescopic section $f'$. The interior telescopic section $f'$ is provided with a longitudinal slot $g^{21}$ in which a pin $g^{20}$ secured to the stem $g^2$ is placed to prevent any rotative movement of the stem relatively to the telescopic section $f'$, the slot $g^{21}$ being of sufficient length to permit the stem $g^2$ to move endwise in said section to the desired extent. The part or nut L' is given a partial rotative movement by a pitman L² pivotally attached to said nut, as shown in Figs. 11, 12 and 13, the other end of which is connected by a ball and socket joint L³ to the lever I, which lever forms a handle portion preferably mounted adjacent to the handle portion J fixedly attached to the movable portion of the shield. Upon the movement of the handle I from the position seen in Fig. 12 to that seen in Fig. 11, the pitman L² is moved in an endwise direction toward the nut L' and in so doing gives such nut a partial rotation to the extent shown, that is, from the position shown in Fig. 12 to that shown in Fig. 11. This partial rotation is, owing to the pitch of the screw threads, sufficient to give the stem $g^2$ the extent of endwise movement necessary to release the male member or conical part $g'$ from the female member or split shell section $g$ of the holding means and permit the telescopic sections of such operating means to move endwise relatively to each other for releasing the movable portion of the shield from the holding means and permit such movable portion to be moved from one desired position to another. Upon the movement of the handle I from the position seen in Fig. 11 to that seen in Fig. 12 the nut L' is given a partial rotation in the reverse direction on the stem $g^2$ and the male or conical part $g'$ is moved into the female or shell portion and the telescopic sections $f$ $f'$ are fixedly secured together to hold the movable portion of the shield in the desired position until it is desired to change that position.

It is preferred that the handle portions I of the operating means seen in Figs. 11, 12 and 13 shall be connected together, that is, that there be such handle portions at opposite side edges of the shield so connected together that when one is grasped and moved the other one correspondingly moves and with like results as in case of the embodiment shown in preceding figures of the drawings. It is also preferred that the holding means shall be duplicated at opposite side edges of the shield as in the case of the embodiment seen in preceding figures.

In Figs. 14 to 17, another embodiment of my invention is illustrated. As here shown, modified holding means are employed for securing the telescopic sections of such means together and also modified operating means are shown by which the holding means are operated to release and fixedly secure the telescopic sections of such means together. The wind shield itself, as here shown, is of substantially the same construction as in preceding figures and the telescopic sections of such holding means are preferably pivotally connected with the movable portions of the shield and the vehicle in substantially the manner shown in some of the preceding figures of the drawings. These holding means, as thus shown, consist of an interior telescopic section O and an exterior section O' having means M connected with the section O and movable relatively thereto to frictionally engage with the section O' to secure the sections together and release them from their secured position. The telescopic section O' is pivotally secured to the vehicle by the ball and socket joint K' and the section O is pivotally attached to the movable portion of the shield by the hanger or bracket $O^2$, pivotally mounted upon the pin or pivot $o$ as more particularly seen in Fig. 14 of the drawings. The means M by which the telescopic sections of the holding means are locked together and unlocked consist of the clamping pieces $m$, more particularly seen in Figs. 16 and 17 of the drawings, mounted in and carried by the interior telescopic section O, which pieces or members $m$ are adapted to frictionally engage with the interior surface of the telescopic section O'. These clamping members or pieces $m$ are pivotally secured together and to an endwise movable bar or rod M' by links $m'$, as is more particularly seen in Figs. 16 and 17. These links $m'$ form toggle joints by which the clamping members are forced away from each other and brought nearer together upon the endwise movement of the bar or rod M', accordingly as the telescopic sections O and O' are to be secured together or released to permit the movable portion of the shield to be moved from one desired position to another.

Figures 14, 15, 16, 17:
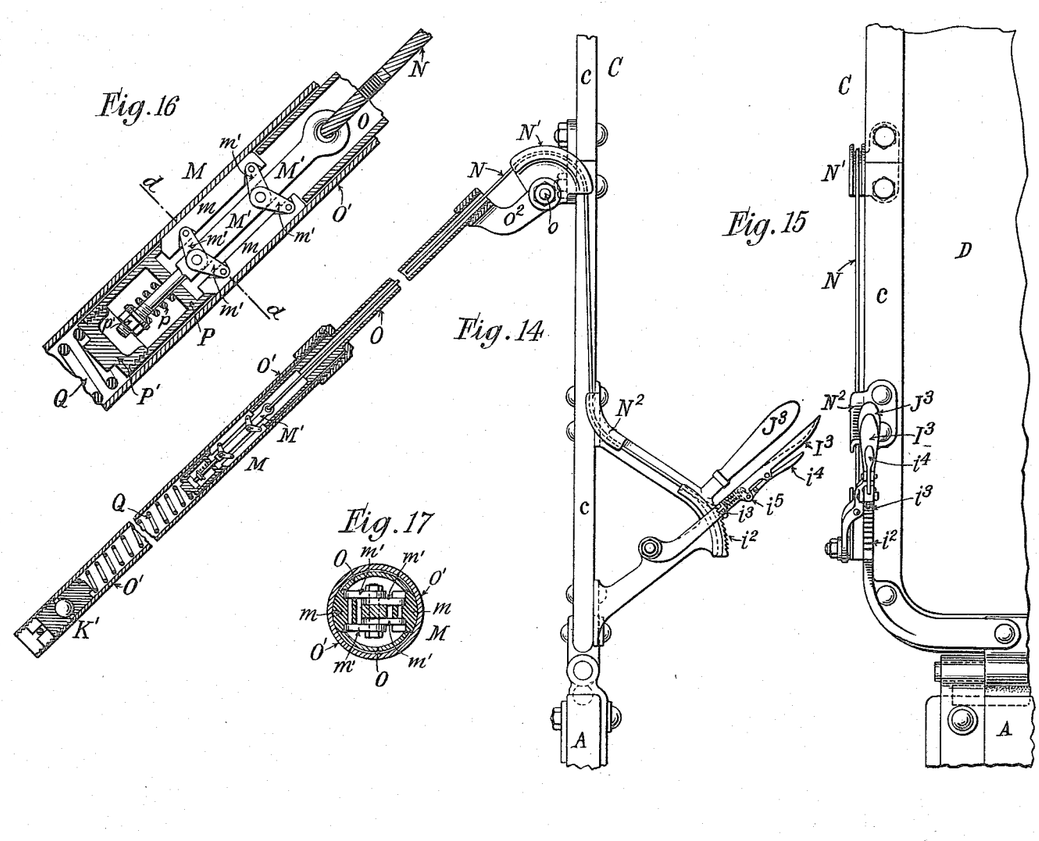
Fig. 14 shows in side elevation another modified form or embodiment of my invention wherein a modified form of holding and releasing means is illustrated, as well as a modified form of operating means for controlling the operation of such holding means.
Fig. 15 shows in front elevation one end of the wind shield and the modified form of means illustrated in Fig. 14.
Fig. 16 illustrates on an enlarged scale the modified form of clamping means seen in Fig. 14.
Fig. 17 shows in cross section the construction seen in Figs. 14 and 15 on line $d$—$d$ of Fig. 16 when looking downwardly with the movable links shown in full lines.

The lower portion of the telescopic section O is provided with a partition P and its end is closed with a nut P', a chamber being formed in such section O between the partition P and nut P'. The lower end of the bar or rod M' passes through an opening in the partition P and bears upon its lower end a spring $p$, one end of which rests against the partition P and the other against a nut $p'$ at the extreme lower end of the rod or bar M'. The tension of this spring $p$ tends to move the rod M' endwise and consequently tends to bring the clamping members $m$ nearer together and out of frictional engagement with the interior surface of the telescopic section O' of the holding means.

Within the telescopic section O' and between the end of the section O and the lower end of the section O' a spring Q is arranged, the tension of which tends to move the telescopic section O out of the section O' and to move the movable portion of the shield with it and, consequently this spring Q has to be compressed when the movable portion of the shield is moved from the upright toward the horizontal position to move it out of protecting position. The tension of such spring Q opposes the movement of the movable portion of the shield in moving from the upright toward the horizontal direction and thereby counteracts, more or less, the action of gravity counterbalancing such movable portion of the shield accordingly as the tension of such spring is designed to do this work. Upon the movement from the horizontal toward the protecting position of this movable portion of the shield, the tension of this compressible spring Q tends to lift the weight of such movable portion of the shield, thus counterbalancing such portion to the extent of such tension and thereby aiding in the movement of such movable portion from one desired position to another.

The modified operating means shown in these Figs. 14 to 17 consist of a cord or rope N connected at one end to the movable bar or rod M', which in turn is connected with the toggle joints formed by the links $m$ and passing through the interior of the telescopic section O and then over a bearing N', fixedly secured to the movable portion of the shield, as shown, and thence passes over a fixed guide piece $N^2$, also fixedly secured to the movable portion of the shield and thence on to a pivoted lever or handle portion $I^3$. This handle portion $I^3$ is preferably arranged or located adjacent to a fixed lever or handle portion J³ attached to the movable portion of the shield, as seen in Figs. 14 and 15 of the drawings. This handle portion I³, as there shown, is pivotally attached to the bracket on which the handle J³ of the operating means is formed. The attachment of the cord or rope N to the handle I³ is between the point at which the handle is pivoted to the bracket and the end which is grasped to move it and the cord or rope N relatively to the handle portion J³ of the shield. The movement of the handle portion I³ away from the handle portion J³ moves the rope or cord N and consequently correspondingly moves the bar or rod M' and causes the toggle joints to move the clamping members or pieces away from one another and into holding engagement with the interior surface of the telescopic section O' of the holding means, to secure such section in fixed relations to the telescopic section O. This handle I³ is provided with a pawl or clutch $i^3$ and the bracket to which the handle J³ is attached is provided with a segment having ratchet teeth $i^2$ thereon with which the pawl or clutch $i^2$ may engage to hold the lever I³ in the desired position for the clamping members or parts $m$ to suitably engage with the interior surface of the telescopic section O' and secure the telescopic sections fixedly together. This pawl or clutch $i^3$ is movable in an endwise direction to engage with the ratchet teeth $i^2$ by a suitable coiled spring and it is moved out of such engagement, against the tension of the spring, by a lever $i^4$ and a bell crank connection $i^5$, in a well known manner. Upon the release of this pawl or clutch $i^3$ from the ratchet teeth $i^2$ and the movement of the handle $i^3$ toward the handle J³, the cord N and bar or rod M' is moved by the spring $p$ in a direction to bring the clamping parts $m$ nearer together and out of frictional engagement with the interior surface of the telescopic section O', and thereby releasing the holding means to permit the movable portion of the shield to be moved from one desired position to another.

It is preferred in the embodiment shown in Figs. 14 to 17 that the modified holding and operating means be duplicated at opposite side edges of the shield. If this be done then, with this modified form of operating means both hands of the operator would be used to grasp the duplicated handle portions to release and hold the holding means in the desired position. It is also preferred that the handle portions of the operating means in this modified construction be arranged or located relatively to the handle portion J³ on the movable portion of the shield, so that the operator may operate the same from his seat in the vehicle.

In each of the embodiments herein shown the movable portion of the shield or guard is moved from one position to another and is then locked and held in such position and released therefrom by means termed "holding means", which have connected therewith means termed "operating means" by which a portion or portions of the "holding means" is actuated to lock and fixedly hold different portions of such holding means in fixed positions, relatively to one another and to release such portions and permit them to move unrestrained when the movable portion of the shield is moved from one desired position to another.

The operating means consist in part of a handle portion or portions which is movable to move the portion or portions of the holding means which is moved from one position to another to lock and hold the holding means fixedly in position relatively to the movable part or portion of the shield and to release the same. The handle portion or portions is preferably arranged or located within convenient reach of the operator when occupying the seat in the vehicle, but such portion or portions may be otherwise arranged or located if desired. The handle portion or portions is also preferably arranged or located adjacent to means adapted to be grasped to move the movable portion of the wind shield from one desired position to another, so that the handle portion or portions of the operating means and means adapted to be grasped to move the movable portion of the shield may both be grasped by the same hand of the operator in moving such movable portion of the shield from one desired position to another, but such handle portion or portions may be otherwise arranged or located if desired. In the embodiment seen in Figs. 1 to 10 the handle portions I are shown as being connected together so that when one is moved the other correspondingly moves and as there shown either one of the two handle portions I is operable by the operator to move the movable portion or portions of the duplicate holding means seen in that embodiment, but such handle portions may be thus connected or not as desired.

I have shown and described the use of springs for counterbalancing the weight of the movable portion of the shield in moving it from one desired position to another. In the embodiment as thus seen in Figs. 1 to 10 a torsional spring or springs are shown for thus counterbalancing the movable portion of the wind shield or guard. In the embodiment illustrated in Figs. 14 to 17, I have shown and described the use of a spiral spring or springs for counterbalancing such movable portions of the shield. Torsional springs arranged as shown are the preferred form of counterbalancing means, but any other form may be employed if desired. I have also shown and described "holding means" in which two forms of means are employed for locking and fixedly holding the different portions of the holding means in fixed relation to the movable part or portion of the wind shield or guard, but other forms of holding means, as well as other forms of clamping means than those shown and described may be employed if desired. I have also shown the holding means having telescopic sections with the clamping means arranged in connection with one section and frictionally engageable with the other section to lock or fixedly hold the sections together and release them to permit of their movement relatively to each other and their points of attachment upon the movement of the movable portion of the shield from one desired position to another, but other forms of holding means unprovided with what is technically known as telescopic sections may be employed if desired. The telescopic form is the preferred form and for manifest reasons, it being the best form known to me at this time.

What is herein shown and described will naturally suggest to those skilled in the art other specific forms, constructions and arrangements of parts than those herein shown which, while varying in form or detail, will be combined together in substantially the manner herein set forth for accomplishing essentially the same work as is accomplished by the combinations herein described and because of this I do not desire to limit myself to the specific forms, constructions and arrangements of parts herein set forth, but desire to include all forms, constructions and arrangements that are within the spirit or principle of my invention.

What I claim as new is:—

1. The combination with a vehicle; of a wind shield comprising a movable portion, adjustable holding means connected to the vehicle and the movable portion and including a locking part for securing the holding means in any adjusted position, and operating means for the locking part comprising power transmitting rods arranged at an angle to each other and associated, respectively, with the holding means and the movable portion of the shield, and intermeshing gear members associated with the rods for transmitting the motion of the rod associated with the shield to the rod associated with the holding means, substantially as and for the purpose described.

2. The combination with a vehicle; of a wind shield comprising a movable portion, adjustable holding means including telescoping rods connected to the vehicle and to the adjustable portion of the shield, the holding means also including a movable locking part for securing the rods in any adjusted position, and operating means for the holding part comprising power transmitting parts associated with the holding rods and extending lengthwise thereof, and with the movable portion of the shield, the rods being arranged at an angle to each other and having intermeshed toothed members connected, respectively, to said power transmitting parts, a spring arranged to move the locking part out of operative position and the toothed member being movable out of mesh with the other, and a stronger spring acting on the power-transmitting part associated with the movable portion of the shield to return the power-transmitting parts and the locking part to their starting positions, substantially as and for the purpose specified.

3. The combination with a vehicle; of a wind shield including a hinged portion, adjustable brace rods pivotally connected to the vehicle and to the hinged portion eccentric to the axis thereof, the holding means comprising a movable locking part operable to secure the brace rods in any adjusted position, and operating means for the locking part including power transmitting parts associated, respectively, with the brace rods and the movable portion of the shield, said parts being arranged at an angle to each other and intermeshing gearing connected, respectively, to the power transmitting parts and supported by the movable portion of the shield near the point of connection of the holding means and the movable portion of the shield and at an angle to said parts, substantially as and for the purpose set forth.

4. The combination with a vehicle; of a wind shield comprising a movable portion, adjustable brace rods connected to the movable portion and including a movable locking part for securing the holding means in any adjusted position, and operating means for the locking part comprising endwisely movable parts extending, respectively, in the direction of the plane of the movable portion of the wind shield, and parallel to the direction of the adjusting movement of the rods, a toothed segment pivoted to the movable portion of the wind shield and connected to one of said parts and a rack associated with the other of said parts and meshing with the segment, substantially as and for the purpose described.

5. The combination with a vehicle; of a wind shield comprising a hinged movable portion, adjustable holding means pivotally connected to the movable portion eccentric to the axis thereof and including a movable locking part for securing the holding means in any desired position, and operating means for the locking part including power transmitting connections, a portion of which extends in the direction of the plane of the wind shield and includes a rack, and another portion of which extends parallel to the direction of the adjusting movement of the holding means, the power-transmitting connections also including a toothed segment mounted concentric with the pivotal axis connecting the holding means and the movable portion of the wind shield and meshing with the rack, substantially as and for the purpose specified.

6. The combination with a vehicle; of a wind shield comprising a hinged movable portion, adjustable holding means pivotally connected to the movable portion eccentric to the axis thereof and including a movable locking part for securing the holding means in any desired position, and operating means for the locking part including power-transmitting connections, a portion of which extends in the direction of the plane of said portion of the wind shield and includes a rack, and another portion of which extends parallel to the direction of the adjusting movement of the holding means, the power-transmitting connections also including a toothed segment mounted concentric with the pivotal axis connecting the holding means and the wind shield and meshing with the rack, the rack being movable out of mesh with the segment when the holding means is unlocked, substantially as and for the purpose set forth.

7. The combination with a vehicle; of a wind shield comprising a hinged portion having a handle, adjustable holding means connected to the vehicle pivotally connected to the movable portion eccentric to the axis thereof and including a movable locking part for securing the holding means in any adjusted position, and operating means for the locking part including a handle located near the first-mentioned handle in position to be grasped and operated simultaneously therewith, substantially as and for the purpose specified.

8. The combination with a vehicle; of a wind shield comprising a hinged portion having a handle, adjustable holding means connected to the vehicle pivoted to the hinged portion eccentric to the axis thereof and including a movable locking part for securing the holding means in any adjusted position, and operating means for the locking part including power-transmitting means including portions carried by the shield and extending in the rear of the shield in the direction of the plane thereof and portions extending lengthwise of the holding means, the first-mentioned portions of the power-transmitting means including a handle located near the first-mentioned handle in position to be grasped and operated simultaneously therewith, substantially as and for the purpose set forth.

9. The combination with a vehicle; of a wind shield comprising a hinged portion having a handle, adjustable holding means connected to the vehicle pivotally connected to the movable portion eccentric to the axis thereof and including a movable locking part for securing the holding means in any adjusted position, and operating means for the locking part including a handle located near the first-mentioned handle in position to be grasped and operated simultaneously therewith, and power-transmitting means including portions extending from the handle around the pivotal connection between the holding means and the movable portion of the shield and lengthwise of the holding means to the locking part, substantially as and for the purpose described.

10. The combination with a vehicle; of a wind shield comprising a hinged portion having a handle located near the hinge thereof, adjustable holding means connected to the vehicle pivotally connected to the movable portion eccentric to the axis thereof and including a movable locking part for securing the holding means in any adjusted position, and operating means for the locking part including a handle located near the first-mentioned handle into position to be grasped and operated simultaneously therewith, substantially as and for the purpose specified.

11. The combination with a vehicle; of a wind shield comprising a hinged portion having a handle located near the hinge thereof, adjustable holding means connected to the vehicle pivotally connected to the movable portion eccentric to the axis thereof and including a movable locking part for securing the holding means in any adjusted position, and operating means for the locking part including a handle located near the first-mentioned handle in position to be grasped and operated simultaneously therewith, and power-transmitting means including portions extending from the handle around the pivotal connection between the holding means and the movable portion of the shield, and lengthwise of the holding means to the locking part, substantially as and for the purpose set forth.

12. The combination with a vehicle; of a wind shield comprising a movable portion having a handle, adjustable holding means connected to the vehicle pivoted to the movable portion and including a movable locking part for securing the holding means in any adjusted position, operating means for the locking part comprising endwisely movable parts carried respectively by the holding means, and the movable portion of the wind shield, gearing including intermeshing members associated respectively with said parts, and carried by said portion of the wind shield, and a handle connected to the endwisely movable member carried by the movable portion of the wind shield, such handle being located near the first-mentioned handle in position to be grasped and operated simultaneously therewith, substantially as and for the purpose described.

13. The combination with a vehicle; of a wind shield comprising a hinged portion having a handle located near the hinge thereof, adjustable holding means including telescoping trace rods pivotally connected respectively to said movable portion eccentric to the axis thereof, and to the vehicle, and an expander within the rods for securing the rods in any desired position, and operating means for the expander including a handle located near the first-mentioned handle in position to be grasped therewith, and power-transmitting connections between the handle and the expander and including parts extending along the movable portion of the shield around the pivotal connection between the brace rods and movable portion of the shield, and axially of the brace rods, substantially as and for the purpose specified.

14. The combination with a vehicle; of a wind shield comprising a movable portion, adjustable holding means pivotally connected to the movable portion, and including a locking part for securing the holding means in any adjusted position, a spring tending to move the locking part out of operative position, and operating means for the locking part including a handle, power-transmitting connections between the handle and the locking part and including endwisely movable members carried respectively by the movable portion of the wind shield and the holding means, and a spring associated with one of said members and tending to move the locking part into operative position against the action of the first-mentioned spring, substantially as and for the purpose set forth.

OLIVER M. EDWARDS.

Witnesses:
KATHRYNE S. GARVIN,
GEORGE G. NORRIS.

Copies of this patent may be obtained for five cents each, by addressing the "Commissioner of Patents, Washington, D. C."